(12) United States Patent
Katoh et al.

(10) Patent No.: US 7,720,927 B2
(45) Date of Patent: May 18, 2010

(54) NETWORK SYSTEM, NETWORK DEVICE, AND PROGRAM PRODUCT

(75) Inventors: Tatuya Katoh, Nagoya (JP); Jiro Sato, Obu (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 11/896,537

(22) Filed: Sep. 4, 2007

(65) Prior Publication Data

US 2008/0071880 A1  Mar. 20, 2008

(30) Foreign Application Priority Data

Sep. 19, 2006  (JP)  ............................. 2006-252922

(51) Int. Cl.
*G06F 15/13* (2006.01)
(52) U.S. Cl. .................. 709/208; 709/203; 709/209; 709/214; 709/226; 370/386; 370/387
(58) Field of Classification Search .......... 709/203, 709/208, 209, 214, 226; 370/386, 387
See application file for complete search history.

(56) References Cited

U.S. PATENT DOCUMENTS

| | | | | |
|---|---|---|---|---|
| 5,835,710 A | | 11/1998 | Nagami et al. | |
| 5,852,718 A | * | 12/1998 | Van Loo | 709/208 |
| 5,960,174 A | * | 9/1999 | Dew | 709/208 |
| 6,343,322 B2 | | 1/2002 | Nagami et al. | |
| 6,598,080 B1 | | 7/2003 | Nagami et al. | |
| 7,346,051 B2 | * | 3/2008 | Nakayama et al. | 370/386 |
| 2002/0116468 A1 | * | 8/2002 | Ishikawa | 709/208 |
| 2004/0015590 A1 | | 1/2004 | Nagami et al. | |
| 2005/0100025 A1 | | 5/2005 | Nagami et al. | |
| 2007/0118605 A1 | * | 5/2007 | Yamada et al. | 709/214 |

FOREIGN PATENT DOCUMENTS

JP  2000-250850  9/2000

* cited by examiner

*Primary Examiner*—Jinsong Hu
(74) *Attorney, Agent, or Firm*—Nixon & Vanderhye P.C.

(57) ABSTRACT

A secondary device receives an instruction message accompanied by a counted value and compares the received counted value with a counted value stored in an internal memory. Thus, it is determined whether the currently received instruction message is the same as a previously received instruction message and an execution of a process based on the previous instruction message was completed. When the received instruction message is not the same, the secondary device transmits a response message after executing a process according to the received instruction message. In contrast, when the instruction message is the same, the secondary device transmits a response message based on a process history in the internal memory without executing the process according to the received instruction message.

12 Claims, 3 Drawing Sheets

| SERVICE | COMMAND | TARGET | PARAM. 1 | PARAM. 2 | COUNTED VALUE |
|---|---|---|---|---|---|

NETWORK SYSTEM, NETWORK DEVICE, AND PROGRAM PRODUCT

CROSS REFERENCE TO RELATED APPLICATION

This application is based on and incorporates herein by reference Japanese Patent Application No. 2006-252922 filed on Sep. 19, 2006.

FIELD OF THE INVENTION

The present invention relates to a network system which includes multiple network devices communicated with each other.

BACKGROUND OF THE INVENTION

There is known a network system in which a network device as a primary device (so called "master") controls other network devices as secondary devices (so called "slaves") (Refer to Patent document 1).

Patent document 1: JP-2000-250850 A

In such a system, after receiving an instruction from the primary device, the secondary device transmits to the primary device a response that a process has been executed according to the instruction. After receiving the response, the primary device continues subsequent processes.

When the response from the secondary device does not reach the primary device within a predetermined period because of a certain reason, the primary device generally issues the same instruction to the secondary device again to urge the secondary device to execute the process and respond.

For instance, a response from the secondary device may not reach the primary device because of a reason such as a trouble in the communication channel. In this case, in spite of having executed the process based on the previous instruction, the secondary device may execute the same process again in response to the same instruction from the primary device.

This consumes the resource of the secondary device unnecessarily; further, the response from the secondary device can reach the primary device after the secondary device has executed the same process in multiple times. This results in worsening the response of the secondary device to the instruction from the primary device.

SUMMARY OF THE INVENTION

The present invention is made to solve such a problem. It is an object of the present invention to provide a technology in a network system to help prevent unnecessary consumption in the resource of a secondary device and deterioration in the response of the secondary device to an instruction from a primary device.

To achieve the above object, according to an example of the present invention, a network system is provided as follows. The system includes a primary device and at least one secondary device controlled by the primary device. The primary device comprises an execution instruction unit and an information addition unit. The execution instruction unit is configured for transmitting, when a predetermined instruction condition is fulfilled, to the secondary device an instruction message for ordering an execution of a predetermined process. The information addition unit is configured for adding, to the instruction message to be transmitted, condition information indicating that the instruction condition is fulfilled. Here, when a response message for responding that the predetermined process is executed according to the instruction message is not received from the secondary device within a predetermined period after the instruction message is transmitted, the instruction message to which the same condition information is added is again transmitted to the secondary device. In contrast, the secondary device comprises a process execution unit, a history storing unit, and a process response unit. The process execution unit is configured for executing the predetermined process when the instruction message and the condition information are received from the primary device. The history storing unit is configured for storing, in a storage unit, (i) a history of executing the predetermined process and (ii) the received condition information. The process response unit is configured for (i) transmitting to the primary device the response message after the predetermined process is executed according to the received instruction message when the received condition information is not stored in the storage unit, and (ii) transmitting to the primary device the response message based on the history of executing the predetermined process when the received condition information is already stored in the storage unit.

As another example of the present invention, a network device comprises all the units included in the primary device in the above network system.

As another example of the present invention, a network device comprises all the units included in the secondary device in the above network system.

As another example of the present invention, a computer program product in a computer-readable medium comprises instructions for achieving all the units included in the primary device of the above network system.

As another example of the present invention, a computer program product in a computer-readable medium comprises instructions for achieving all the units included in the secondary device of the above network system.

As yet another example of the present invention, a method is provided for communicating in a network system communicably connecting a primary device and a secondary device controllable by the primary device. The method comprises the steps of: transmitting, when a predetermined instruction condition is fulfilled, from the primary device to the secondary device an instruction message for ordering an execution of a predetermined process while being accompanied by condition information indicating that the instruction condition is fulfilled; transmitting again from the primary device to the secondary device the instruction message accompanied by condition information identical to the condition information accompanying the instruction message, which is previously transmitted, when a response message for responding that the predetermined process is executed according to the instruction message is not received from the secondary device within a predetermined period after the instruction message is previously transmitted; executing the predetermined process when the instruction message and the condition information are received in the secondary device; storing, in a storage unit in the secondary device, (i) a history of executing the predetermined process and (ii) the received condition information; transmitting from the secondary device to the primary device the response message after executing the predetermined process according to the received instruction message when the received condition information is not stored in the storage unit; and transmitting from the secondary device to the primary device the response message without executing the predetermined process according to the received instruction message, based on the history of executing the predetermined process, when the received condition information is already stored in the storage unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment of the present invention is directed to a network system as a vehicle remote control system mounted in a subject vehicle.

(1) Configuration

Figure 1:
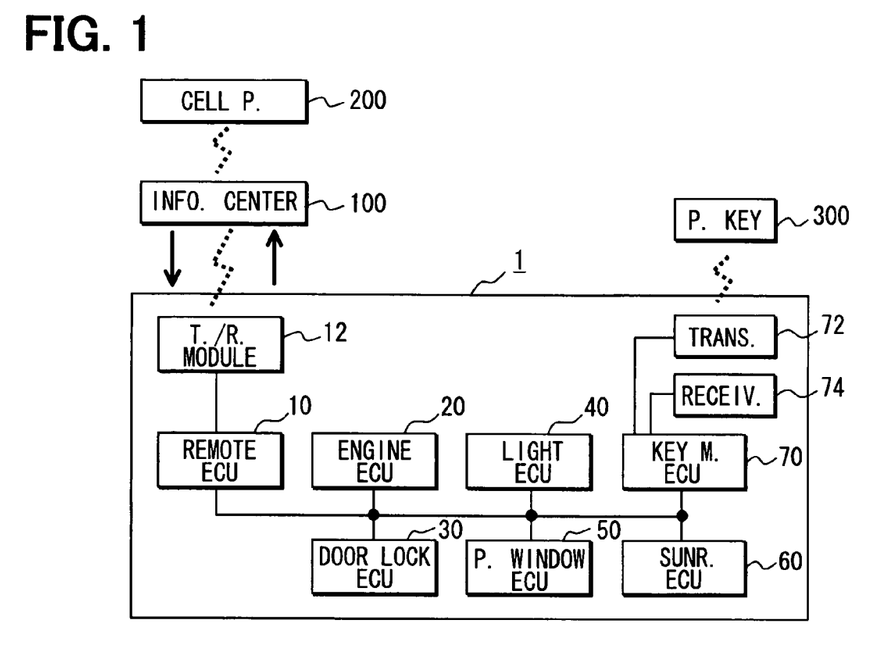
FIG. 1 is a block diagram of a configuration of a network system according to an embodiment of the present invention.

A vehicle remote control system 1 includes multiple network devices communicably connected with each other via a network (CAN (Controller Area Network)). One of the network devices serves as a primary device. The primary device controls the other network devices as secondary devices.

In this embodiment, multiple electronic control units (ECU) which control operations of various parts of the vehicle are connected to the network as the network devices. Among the multiple ECUs, a remote ECU 10 serves as the primary device to control other ECUs.

The ECUs connected to the network include a remote ECU 10 to control each ECU, an engine ECU 20 to control the engine of the vehicle, a door lock ECU 30 to control lock of doors of the vehicle, a light ECU 40 to control lights of the vehicle, a power window ECU 50 to control opening and closing of windows of the vehicle, a sunroof ECU 60 to control opening and closing of the sunroof of the vehicle, and a key matching ECU 70 to collate a key for starting the vehicle.

The remote ECU 10 receives a control instruction which indicates a control content of each part of the vehicle from an information center 100 through a data transmission and reception module 12. The remote ECU 10 controls each ECU by executing a process based on the received control instruction.

The information center 100 is connectable through the network, such as the Internet, from a portable terminal (e.g., cell phone) 200. The information center 100 receives a control instruction from the connected portable terminal 200 and relays it to the vehicle remote control system 1. Here, the control instruction can specify control contents such as (i) which part of the vehicle should be controlled, (ii) an order in controlling multiple parts, and (iii) what kind of process a secondary device is made to perform.

The key matching ECU 70 exchanges information for collating with a portable key 300 through a transmitter 72 and a receiver 74, and collates the portable key 300 based on the information.

(2) Remote Process by the Primary Device

The remote ECU 10 as the primary device performs a procedure of a remote process according to the program stored in the internal memory as a storage unit. The procedure of the remote process will be explained with reference to FIG. 2. The remote process is started when a control instruction is received through the data transmission and reception module 12.

Figure 2:
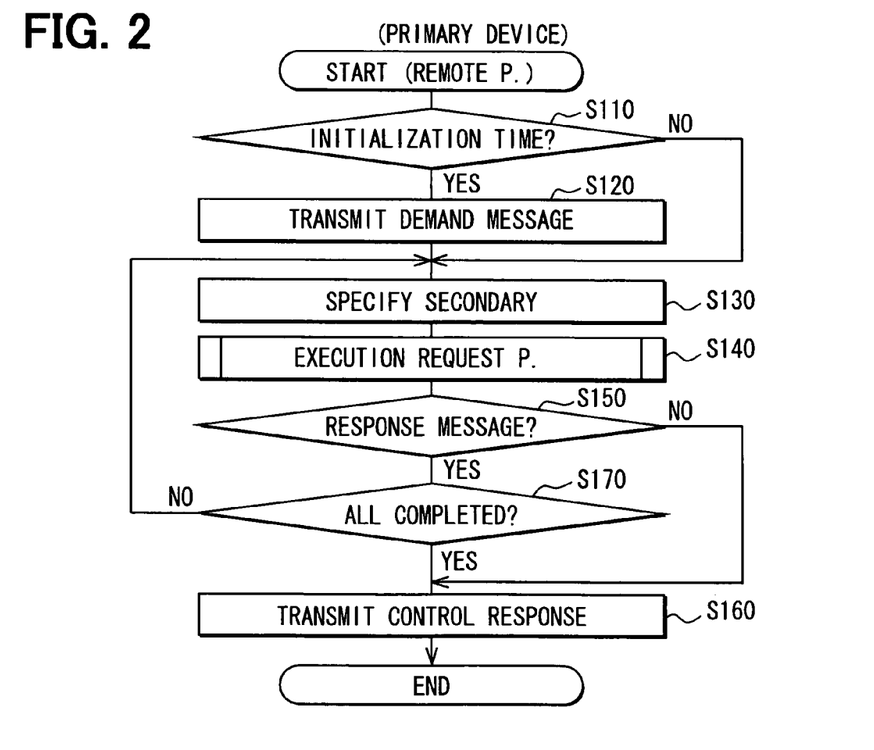
FIG. 2 is a flowchart diagram illustrating a remote process.

After the start of the remote process, it is determined first whether it is the time (i.e., initialization time) when a process history of the secondary device is initialized (S110).

In this embodiment, each ECU as the secondary device executes a predetermined process in response to an instruction from the remote ECU 10, and stores a history of executing the predetermined process in an internal memory. At S110, it is determined that it is the initialization time when this remote process is started with an interval equal to or more than a predetermined period (e.g., 5 minutes) after a remote process previously started ends.

When it is determined that it is the initialization time (S110:YES), a demand message for requiring that the process history be initialized is transmitted (i.e., broadcasted) to all ECUs of secondary devices (S120). Then S130 is performed. The secondary device which receives this demand message eliminates a process history stored in an internal memory as a storage unit, which will be explained below.

In addition, the transmission of the demand message at S120 may be designed to be certainly executed whenever this remote process is started. For the purpose, the remote process should be designed to proceed to S120 without performing S110.

When it is not determined that it is the initialization time (S110: NO), Then S130 is performed without performing S120.

Next, the remote ECU 10 specifies a secondary device, which is required to perform an execution of a process, and a content of the process (S130). When S130 is performed for the first time after the start of the remote process, an ECU corresponding to a secondary device which should be controlled first is specified according to the control content specified by the control instruction received before the start of the remote process. In contrast, when S130 is performed for the second time or later after the start of the remote process, an ECU corresponding to a secondary device which should be controlled second or later is specified based on the received control instruction. Then, the content of the process, which the corresponding ECU should be required to perform, is specified based on the control instruction.

Next, on condition that the secondary device and the content of the process are specified at S130, an execution request process is performed (S140).

Figure 3:
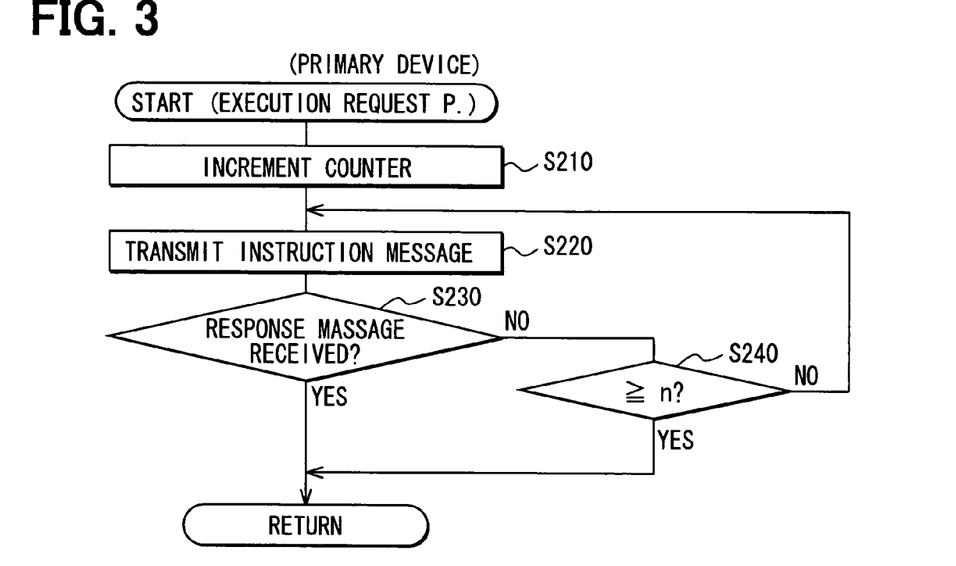
FIG. 3 is a flowchart diagram illustrating an execution request process.

In this execution request process, as indicated in FIG. 3, a synchronous counter is incremented first (S210). Then, an instruction message as instruction information for requiring an execution of the content of the process specified at S130 and a resultant report is transmitted to the secondary device in the state where a counted value of the synchronous counter at this time is added (S220).

Figure 4:
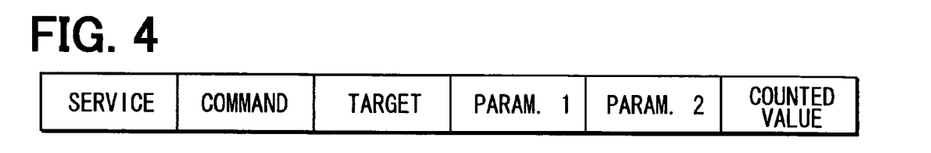
FIG. 4 is a diagram illustrating a data structure of an instruction message.

In the embodiment, as indicated in FIG. 4, data of a message format having six bytes is used as an instruction message, and transmitted to the secondary device after each parameter is set in a corresponding field within the data.

In detail, a parameter which specifically indicates the content of the process specified at S130 is set in a field (service kind, demand command) about the content of the process. A parameter which indicates the secondary device specified at S130 is set in a field (service kind, instruction target) about a transmission destination of the instruction message. A counted value of the synchronous counter at this time is set in a field (counted value).

In addition, in this embodiment, the synchronous counter is designed to count up from an initial value '00' to the upper limit 'FF' and then return to the initial value. Thus, the field about the counted value in the instruction message can accommodate values up to the upper limit (i.e., one-byte field).

Then, after the transmission of the instruction message at S220, when it is determined that a response message of reporting an execution result is not received within a predetermined time (S230: NO), S240 is then performed. Until a count of transmissions of the instruction messages reaches a predetermined value (n) (S240: NO), the process returns to S220 to repeat the transmission of the same instruction message (i.e., accompanied by the same counted value) (S220, S230: NO, S240: NO).

In contrast, when it is determined that the response message is received (S230: YES), the process returns to the remote process with the response message regarded as a return value. In contrast, when it is determined that the count of transmissions of the instruction messages reaches the predetermined value (n) or more (S240: YES), the process returns to the remote process with an error of no reception of the response message regarded as a return value.

Thus, after the execution request process at S140 is performed, it is determined whether the return value in the execution request process is "response message" (S150).

When it is determined that the return value is "error" (S150:NO), the control response which indicates that the control result based on the control instruction is "error" is transmitted to the information center 100 through the data transmission and reception module 12 (S160). The remote process is then completed.

In contrast, when it is determined that the return value is "response message" (S150:YES), it is determined whether all the controls according to the control instruction received before the start of the remote process are completed (S170).

When it is determined that all the controls are not completed (S170:NO), the process returns to S130, where a secondary device, which is required to perform an execution of a process, and a content of the process are specified. Here, as explained above, according to the control instruction, an ECU corresponding to a part which should be controlled next is specified as a corresponding secondary device.

Thus, S130 to S150, and S170 are repeated until all the controls according to the control instruction are completed. When it is determined that all the controls are completed (S170:YES), the process shifts to S160. At S160, a control response indicating "response message" as a return value at S140 (execution request process) is transmitted to the information center 100 through the data transmission and reception module 12. Then, the remote process is completed.

In addition, in this embodiment, the upper limit 'FF' of the counted value is designed so that a counted value may become larger enough than the number of instruction messages transmitted based on a single certain control instruction.

(3) Execution Response Process by the Secondary Device

Each ECU 20 to 70 as the secondary device performs a procedure of an execution response process according to a program stored in an internal memory. The procedure of the execution response process will be explained with reference to FIG. 5. The execution response process is started each time the secondary device receives a message or data from the primary device through the network. In addition, when another message or data is received from the primary device during operation of a first execution response process, a new second execution response process is started in parallel with the first execution response process under operation.

Figure 5:
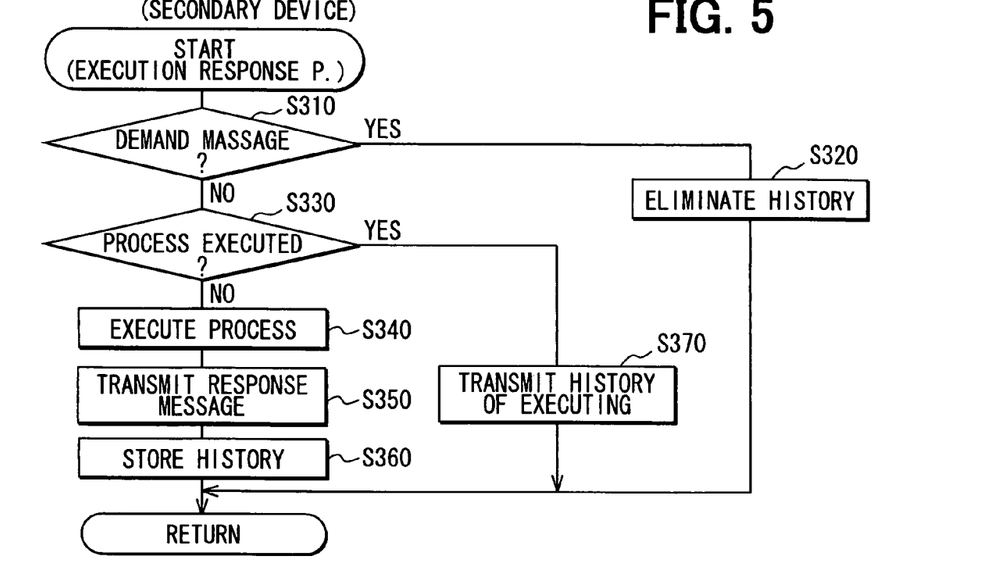
FIG. 5 is a flowchart diagram illustrating an execution response process.

When the execution response process is started, it is determined whether the data received before the start of the execution response process is a demand message (S310). This demand message is transmitted from the primary device at S120 in FIG. 2.

When it is determined that the received data is a demand message (S310: YES), the process history stored in the internal memory of the secondary device is eliminated (S320). Then, the execution response process is completed. For instance, the process history includes a content of a process executed according to an instruction message from the primary device, a state of the secondary device after executing the process, and a counted value added to the instruction message. Each secondary device is provided so that the process history is stored in the internal memory for every execution of the process based on the instruction message. Thus, at S320, the process history stored in the internal memory is eliminated.

Moreover, when the received data is determined to be an instruction message instead of a demand message (S310: NO), it is determined whether the currently received instruction message is the same as an instruction message most recently received and, in addition, whether an execution of the process based on the instruction message is completed (S330).

Here, it is determined whether an applicable state takes place (i.e., whether the content of the process and counted value which are indicated by the received instruction message (i.e., received information) accord with the content of the process and counted value in the process history stored in the internal memory (i.e., stored information)). When both the received information and the stored information accord to each other, it is determined that the applicable state takes place.

When it is not determined that the applicable state takes place (S330: NO), the process based on the received instruction message is executed (S340). A response message as response information indicating an execution result is generated and transmitted to the primary device (S350). This response message indicates the state of the secondary device after execution of the process, and is received by the primary device at S230 in FIG. 3.

The process history based on the execution result from S340 is stored in the internal memory (S360), and the execution response process is then completed. At S360, the following information is stored in the internal memory as a process history or overwritten when already stored: a content (process content) of the process executed at S340; a state of the secondary device after execution of the process (secondary device state after execution); and information groups such as an execution clock time.

When it is determined that the applicable state takes place (S330: YES), the secondary device state after execution stored at this time in the process history in the internal memory is transmitted to the primary device as a response message indicating that the state of the secondary device after executing the process content ordered by the instruction message (S370).

(4) Effects

Figure 6:
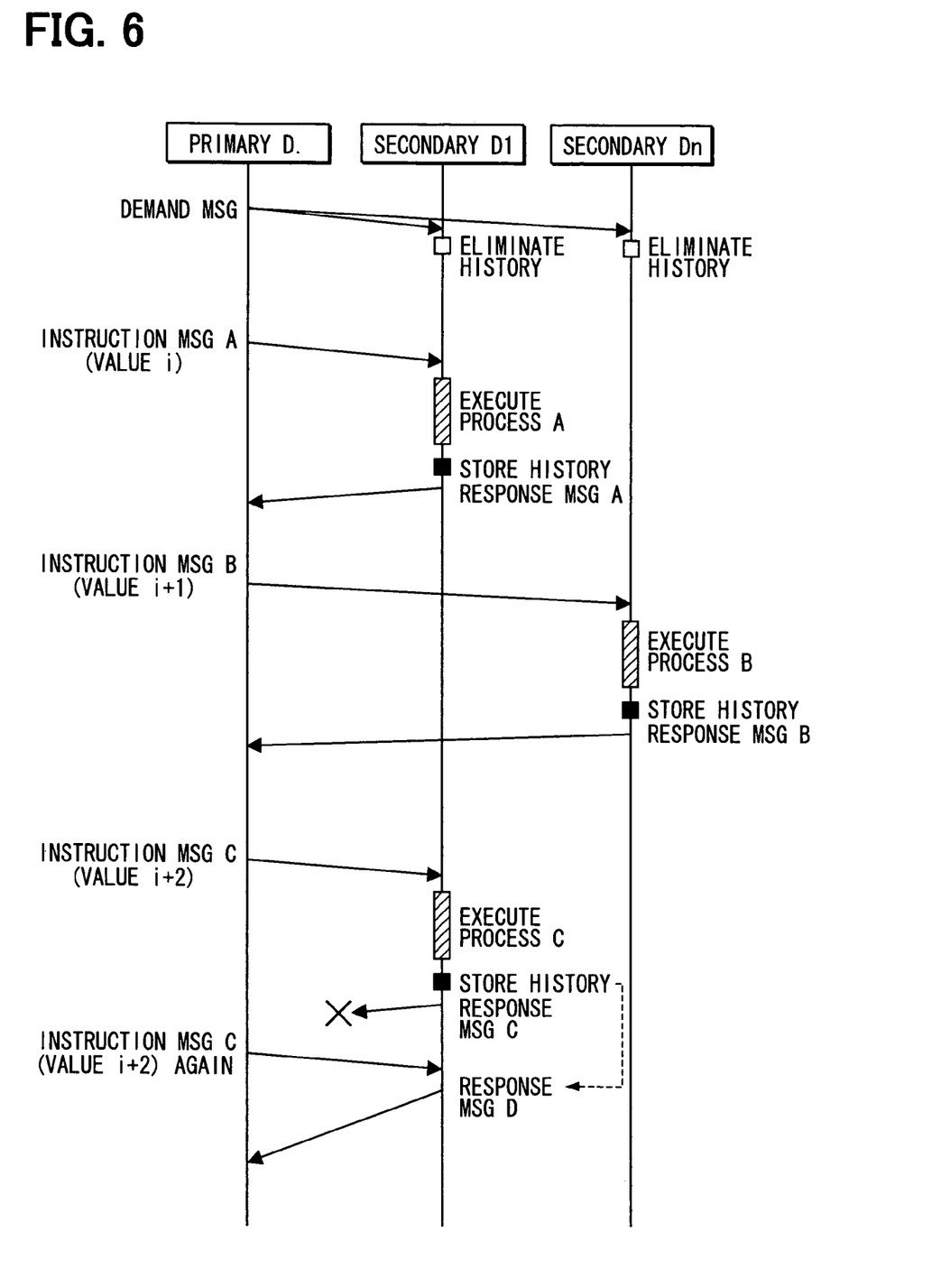
FIG. 6 is a time chart diagram illustrating procedures of a primary device and a secondary device.

In a vehicle remote control system 1, when the response message from the secondary device does not reach the primary device within the predetermined period because of a certain reason (refer to "instruction message C" in FIG. 6), the primary device transmits the same instruction message to the secondary device again (S230: NO→S240: NO→S220 in FIG. 3) to urge the secondary device to execute the process and respond (refer to "instruction message D" in FIG. 6).

The secondary device which receives the instruction message compares the counted value added to this instruction message with the counted value stored in the internal memory. Thus, it is determined whether the received instruction message is in an applicable state, i.e., whether the currently received instruction message is the same as an instruction message most recently received and, further, an execution of the process based on the instruction message is completed (S330 in FIG. 5). When the instruction message is not in the applicable state, the secondary device transmits a response message after executing the process according to the received instruction message (S340 to S350 in FIG. 5, "response message A to C" in FIG. 6). In contrast, when the instruction message is in the applicable state, the secondary device transmits a response message based on a history in the internal memory without executing the process according to the received instruction message (S370 in FIG. 5, "response message D" in FIG. 6).

Here, the applicable state, where the received instruction message is the same as an instruction message most recently received and, further, an execution of the process based on the instruction message is completed, may signify the following: in spite of transmitting the response message from the secondary device based on the previous instruction message, the transmitted response message did not reach the primary device because of a certain reason such as a trouble in the communication channel (i.e., network).

In such a state, the secondary device immediately transmits a response massage to the primary device based on the history of the process executed based on the previous received instruction message, without executing the process according to the received instruction message. For this reason, a resource is not unnecessarily consumed by carrying out repeat execution of the same process.

Moreover, since the secondary device immediately transmits the response message to the primary device based on the history of the process, the response of the secondary device to the instruction can be enhanced compared with the case of transmitting the response massage after executing such a process.

In addition, in this embodiment, whenever receiving this control instruction, the primary device determines that it is an initialization time. The history stored in the secondary device can be thereby eliminated.

Further, each time an instruction message is transmitted from the primary device (S220 in FIG. 3), the counted value, which is incremented (S210 in FIG. 3), is added as condition information. The secondary device determines whether the counted value added in the received instruction message is the same as that stored in the storage unit. When both are same, the secondary device determines that the received instruction message orders an execution of the process previously executed. Based on the history in the internal memory, a response message can be thereby transmitted immediately (S330: YES→S370 in FIG. 5).

Moreover, in the above embodiment, the counted value of the counter is added to the instruction message transmitted at S220 in FIG. 3. This counter is designed to count up from an initial value '00' to the upper limit 'FF' and then return to the initial value. For this reason, the counted value added to the instruction message also returns to the initial value in a fixed cycle. Multiple instruction messages may be transmitted to a single certain secondary device, and the certain secondary device may thereby execute corresponding multiple processes in parallel. In this case, the condition information having the same counted value may be unfavorably added to the multiple instruction messages, each of which orders an execution of a different process. In this case, in spite of not executing a certain process according to the received instruction message, the secondary device may mistakenly determine that the certain process was previously executed. Thus, a response message mistakenly generated based on the history may be transmitted to the primary device from the secondary device.

In this embodiment, the upper limit 'FF' of the counted value is designed so that a counted value may become larger enough than the number of instruction messages transmitted based on a single certain control instruction. Therefore, in the remote process based on a single control instruction, a mistaken response message can be prevented from being transmitted to the primary device from the secondary device.

Furthermore, when it is determined that it is the initialization time (S110 in FIG. 2), the demand message for requiring that the history should be eliminated is transmitted from the primary device. The secondary device which receives this demand message eliminates the counted value along with the history stored in the internal memory (S110, S120 in FIG. 2, S320 in FIG. 5).

Suppose a configuration where a single secondary device executes multiple processes in parallel. Even in such a configuration, the condition information having the same counted value can be prevented from being added to a different instruction message for ordering a different process, while the resources of the primary device and secondary device are effectively used.

(5) Modifications

Although the embodiment of present invention is explained above, the present invention is not limited to the above embodiment at all and can be adapted to various embodiments as long as within a technical scope of the present invention.

For instance, in the above embodiment, the network system of the present invention is provided to the vehicle remote control system having multiple ECUs which control operations of various parts of the vehicle. However, the network system may be applied to any other system in which multiple network devices are communicably connected with each other.

Moreover, in the above embodiment, on condition that the secondary device and the content of the process are specified at S130, an execution request process is executed (S140). However, the condition used as the trigger, by which this execution request process is executed, may be that the primary device specifies the process which the secondary device should execute or that the time point when the process should be executed is reached in a different process other than the remote process in FIG. 2.

In addition, in this embodiment, the primary device adds the counted value by the counter to the instruction message to then transmit (S220 in FIG. 3). The message or information added to an instruction message at S220 is only required to indicate a condition that the secondary device and the content of the process are specified at S130 in FIG. 2. For example, the time when the secondary device and the content of the process are specified at S130 can be added to the instruction message.

In addition, in this embodiment, each time an instruction message is transmitted from the primary device (S220 in FIG. 3), the counted value, which is incremented (S210 in FIG. 3), is added as condition information. The message or information added to the instruction message may be a counted value of the counter which is decremented one by one from an initial value 'FF' at S210 in FIG. 3. This counter may be designed to count down from the initial value 'FF' to the lower limit '00' and then return to the initial value.

In addition, in this embodiment, each resource for setting up a counted value in the instruction message or the secondary device is secured by one byte (refer to FIG. 4). However, in order to use each resource effectively, the resource may be designed to be smaller than one byte.

At S110, when a remote process is started with an interval equal to or more than a predetermined period after a remote process previously started ends, it is determined that it is the initialization time when the process history in the secondary device can be eliminated. However, the above determination for the initialization time may be differently designed. For example, the initialization time may be determined immediately after the synchronous counter returns to the initial value at S110.

(6) Functions

In the embodiment described above, S130 in FIG. 2, where the secondary device and the content of the process are specified, may function as an instruction condition. S120 in FIG. 2 may function as an elimination demand means or unit.

Moreover, S220 in FIG. 3 may function as an execution instruction means or unit or an information addition means or unit. S210 in FIG. 3 may function as a count means or unit.

S340 in FIG. 5 may function as a process execution means or unit. S360 in FIG. 5 may function as a history storing means or unit. S350, S370 in FIG. 5 may function as a process response means or unit. S320 in FIG. 5 may function as an information elimination means or unit.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(7) Aspects of the Subject Matter

Aspects of the subject matter described herein are set out in the following clauses.

As a first aspect, a network system is provided as follows. The system includes a primary device and at least one secondary device controlled by the primary device. The primary device comprises an execution instruction unit and an information addition unit. The execution instruction unit is configured for transmitting, when a predetermined instruction condition is fulfilled, to the secondary device an instruction message for ordering an execution of a predetermined process. The information addition unit is configured for adding, to the instruction message to be transmitted, condition information indicating that the instruction condition is fulfilled. Here, when a response message for responding that the predetermined process is executed according to the instruction message is not received from the secondary device within a predetermined period after the instruction message is transmitted, the instruction message to which the same condition information is added is again transmitted to the secondary device. In contrast, the secondary device comprises a process execution unit, a history storing unit, and a process response unit. The process execution unit is configured for executing the predetermined process when the instruction message and the condition information are received from the primary device. The history storing unit is configured for storing, in a storage unit, (i) a history of executing the predetermined process and (ii) the received condition information. The process response unit is configured for (i) transmitting to the primary device the response message after the predetermined process is executed according to the received instruction message when the received condition information is not stored in the storage unit, and (ii) transmitting to the primary device the response message based on the history of executing the predetermined process when the received condition information is already stored in the storage unit.

In the above network system, when the response message from the secondary device does not reach the primary device within the predetermined period because of a certain reason, the primary device issues the same instruction message to the secondary device again to urge the secondary device to execute the process and respond.

The secondary device receiving the instruction message compares the condition information added to the instruction message with the condition information stored in the storage unit, and thereby determines whether the received instruction message is identical to the previous instruction message, which ordered the execution of the process, which was executed previously. When the instruction message is not identical to the previous instruction message, the secondary device transmits a response message after executing the process according to the received instruction message. In contrast, when the instruction message is identical to the previous instruction message, the secondary device transmits a response message based on a history in the storage unit without executing the process according to the received instruction message.

Here, that the received instruction message is identical to the previous instruction message ordering the execution of the process, which was executed previously, may signify the following: in spite of transmitting the response message from the secondary device based on the previous instruction message, the transmitted response message did not reach the primary device because of a certain reason such as a trouble in the communication channel.

In such a state, the secondary device immediately can transmit a response message to the primary device based on the history of executing the process according to the previous instruction message without executing the process according to the received instruction message. For this reason, a resource is not unnecessarily consumed by carrying out repeat execution of the same process.

Moreover, since the secondary device immediately transmits the response message to the primary device based on the history of the process, the response of the secondary device to the instruction message can be enhanced when compared with the case of transmitting the response message after executing such a process.

Further, the "instruction condition" serves as a trigger for the execution instruction means of the primary device to transmit the instruction message. The instruction condition may be that a process for the secondary device to need to execute is specified based on an instruction externally received by the primary device, or that a time point to execute the process is reached.

Moreover, the history stored by the history storing means of the secondary device only needs to signify that a process was executed according to an instruction message. For example, the following may be stored as a history: the content of the executed process, the state of the secondary device before and after the execution of the process; or the clock time when the process was executed.

Moreover, the condition information added by the information addition means in the primary device only needs to signify that the instruction condition is fulfilled, without specific contents restricted. For example, it may be a clock time when the instruction condition is fulfilled, and a counted value when the instruction condition is fulfilled, the value indicating the number of times instruction conditions are fulfilled.

As a second aspect, the network system may be configured to adopt such a counted value as condition information with the following.

The primary device further comprises a count unit for counting a value indicating a count of transmissions each time an instruction message is to be transmitted by the execution instruction unit, wherein the information addition unit adds the counted value to the instruction message to be transmitted as the condition information. Here, when the response message in response to the transmitted instruction message is not received, the count unit stops counting the value and the execution instruction unit transmits again to the secondary device the same instruction message to which the same counted value is added.

Under the above configuration, each time an instruction message is transmitted from the primary device, the counted value (e.g., ordinal number), which counts the number of times instruction messages are transmitted, is added as condition information. The secondary device determines whether the counted value added in the received instruction message is the same as that stored in the storage unit. When both are same, the secondary device determines that the received instruction message orders an execution of the process, which was previously executed. Based on the history of the storage unit, a response message can be thereby immediately transmitted.

In addition, the count means in this configuration is only required to increment one by one from a predetermined initial value to the upper limit and then return the counted value to the initial value. Alternatively, the count means may be required to decrement one by one from a predetermined initial value to the lower limit and then return the counted value to the initial value.

When performing the count which returns to the initial value in a cycle, the counted value of the condition information added to an instruction message also returns to the initial value in the cycle. Multiple instruction messages may be transmitted to a single certain secondary device, and the certain secondary device may thereby execute corresponding multiple processes in parallel. Here, the condition information having the same counted value may be unfavorably added to several instruction messages, each of which orders an execution of a different process. In this case, in spite of not executing a certain process according to the received instruction message, the secondary device may mistakenly determine that the certain process was previously executed. Thus, a response message may be mistakenly generated based on the history and transmitted to the primary device from the secondary device.

In order to prevent such a case, the resources of the primary device and secondary device may be secured to allow the counted value by the count means to reach a sufficiently large value. This is not suitable from a standpoint of using each resource effectively.

To that end, while each resource is used effectively, it is required that multiple instruction messages, each of which orders an execution of a different process, are prevented from being accompanied by condition information having the same counted value.

As a third aspect, for achieving the above, the network system may be configured as follows. The primary device further comprises: an elimination demand unit for transmitting, when a predetermined initialization condition is fulfilled, to the secondary device a demand message for requiring that the history of execution along with the condition information stored in the storage unit be eliminated. In contrast, the secondary device comprises: an information elimination unit for eliminating the history of execution along with the condition information in the storage unit when the demand message is received.

Under the above configuration, each time a predetermined initialization condition is fulfilled, a demand message is transmitted from the primary device. The secondary device which receives this demand message eliminates the condition information along with the history stored in the storage unit.

Suppose a configuration, where multiple instruction messages be transmitted to a single certain secondary device, and the certain secondary device thereby execute corresponding multiple processes in parallel. An initialization condition is specified such that the multiple instruction messages are prevented from being accompanied by the condition information having the same counted value even in the above supposed configuration. Thus, while using the resource of the primary device and secondary device effectively, the condition information having the same counted value can be prevented from being added to the multiple instruction messages.

An initialization condition can be specified in various manners without restriction as long as the multiple instruction messages, each of which orders a different process, are prevented from being accompanied by the condition information having the same counted value. For example, an initialization condition may be fulfilled when a predetermined time elapses after an instruction message is transmitted.

Moreover, an instruction may be made to the primary device so that more than one instruction condition may be fulfilled in order. For example, in this case, an initialization condition may be designed to be fulfilled when an instruction is inputted from an outside of the primary device.

As a fourth aspect, for achieving the above, the network system may be configured as follows. When an instruction from an outside is received in the primary device, (i) the elimination demand unit transmits the demand message to the at least one secondary device by determining that the initialization condition is fulfilled and (ii) the execution instruction unit transmits one or more instruction messages to the secondary device one by one in connection with one or more instruction conditions being fulfilled one by one.

Under this configuration, an initialization condition can be fulfilled when an instruction is inputted to the primary device from an outside, and the history stored in the secondary device can be then eliminated.

As a fifth aspect, a network device comprises all the units included in the primary device in the network system of the first aspect.

As a sixth aspect, a network device comprises all the units included in the secondary device in the network system of the first aspect.

As a seventh aspect, a computer program product in a computer-readable medium comprises instructions for achieving all the units included in the primary device of the above network system of the first aspect.

As an eighth aspect, a computer program product in a computer-readable medium comprises instructions for achieving all the units included in the secondary device of the above network system of the first aspect.

As a ninth aspect, a method is provided for communicating in a network system communicably connecting a primary device and a secondary device controllable by the primary device. The method comprises the steps of: transmitting, when a predetermined instruction condition is fulfilled, from the primary device to the secondary device an instruction message for ordering an execution of a predetermined process while being accompanied by condition information indicating that the instruction condition is fulfilled; transmitting again from the primary device to the secondary device the instruction message accompanied by condition information identical to the condition information accompanying the instruction message, which is previously transmitted, when a response message for responding that the predetermined process is executed according to the instruction message is not received from the secondary device within a predetermined period after the instruction message is previously transmitted; executing the predetermined process when the instruction message and the condition information are received in the secondary device; storing, in a storage unit in the secondary device, (i) a history of executing the predetermined process and (ii) the received condition information; transmitting from the secondary device to the primary device the response message after executing the predetermined process according to the received instruction message when the received condition information is not stored in the storage unit; and transmitting from the secondary device to the primary device the response message without executing the predetermined process according to the received instruction message, based on the history of executing the predetermined process, when the received condition information is already stored in the storage unit.

It will be obvious to those skilled in the art that various changes may be made in the above-described embodiments of the present invention. However, the scope of the present invention should be determined by the following claims.

What is claimed is:

1. A network system including a primary device and at least one secondary device controlled by the primary device,
    the primary device comprising:
    an execution instruction unit for transmitting, when a predetermined instruction condition is fulfilled, to the secondary device an instruction message for ordering an execution of a predetermined process; and
    an information addition unit for adding, to the instruction message to be transmitted, condition information indicating that the instruction condition is fulfilled,
    wherein when a response message, which responds that the predetermined process is executed according to the instruction message, is not received from the secondary device within a predetermined period after the instruction message was transmitted, an instruction message to which the same condition information is added is again transmitted to the secondary device,
    the secondary device comprising:
    a process execution unit for performing an execution of the predetermined process when an instruction message, which orders the execution of the predetermined process and is accompanied by condition information, is received from the primary device;
    a history storing unit for storing, in a storage unit, (i) a history of the execution of the predetermined process and (ii) the condition information corresponding to the received instruction message; and
    a process response unit for
    (i) transmitting to the primary device a response message after the execution of the predetermined process is performed according to the received instruction message when the condition information accompanying the received instruction message was not stored in the storage unit, and
    (ii) transmitting to the primary device a response message based on the history of the execution of the predetermined process when the condition information accompanying the received instruction message is already stored in the storage unit.

2. The network system of claim 1, wherein
    the primary device further comprises
    a count unit for counting a value indicating a count of transmissions each time and instruction message is to be transmitted by the execution instruction unit, wherein the information addition unit adds the counted value to the instruction message to be transmitted as the condition information, wherein
    when the response message in response to the transmitted instruction message is not received, the count unit stops counting the vale and the execution instruction unit transmits again to the secondary device the same instruction message to which the same counted value is added.

3. The network system of claim 1, wherein
    the primary device further comprises
    an elimination demand unit for transmitting, when a predetermined initialization condition is fulfilled, to the secondary device a demand message for requiring that the history of execution along with the condition information stored in the storage unit be eliminated, and
    the secondary device comprises
    an information elimination unit for eliminating the history of execution along with the condition information in the storage unit when the demand message is received.

4. The network system of claim 3, wherein
    when an instruction from an outside is received in the primary device,
    (i) the elimination demand unit transmits the demand message to the at least one secondary device by determining that the initialization condition is fulfilled and (ii) the execution instruction unit transmits one or more instruction messages to the secondary device one by one in connection with one or more instruction conditions being fulfilled one by one.

5. A network device comprising all the unit included in the primary device in the network system of claim 1.

6. A network device comprising all the unit included in the secondary device in the network system of claim 1.

7. A computer program product in a computer-readable medium comprises instructions for achieving all the unit included in the primary device of the network system of claim 1.

8. A computer program product in a computer-readable medium comprises instructions for achieving all the unit included in the secondary device of the network system of claim 1.

9. A method for communicating in a network system communicably connecting a primary device and a secondary device controllable by the primary device, the method comprising the steps of:
    transmitting, when a predetermined instruction condition is fulfilled, from the primary device to the secondary device an instruction message for ordering an execution of a predetermined process while being accompanied by condition information indicating that the instruction condition is fulfilled;
    transmitting from the primary device to the secondary device an instruction message accompanied by condition information identical to the condition information accompanying the instruction message, which was previously transmitted, when a response message, which responds that the predetermined process is executed according to the previously transmitted instruction message, is not received from the secondary device within a predetermined period after the instruction message was previously transmitted;

executing the predetermined process when an instruction message for ordering an execution of a predetermined process while being accompanied by condition information is received in the secondary device;

storing, when the predetermined process corresponding to the received instruction message is executed, in a storage unit in the secondary device, (i) a history of the execution of the predetermined process and (ii) condition information accompanying the received instruction message;

transmitting from the secondary device to the primary device a response message after the execution of the predetermined process corresponding to the received instruction message when the condition information accompanying the received instruction message was not stored in the storage unit; and transmitting from the secondary device to the primary device a response message without executing the predetermined process corresponding to the received instruction message, based on the history of the execution of the predetermined process, when the condition information accompanying the received instruction message is already stored in the storage unit.

10. The method of claim 9, further comprising counting, at the primary device, a value indicating a count of transmissions each time an instruction message is to be transmitted by the primary device, wherein the primary device adds the counted value to the instruction message to be transmitted as the condition information, wherein when the response message in response to the transmitted instruction message is not received, the primary device stops counting the value and the primary device transmits again to the secondary device the same instruction message to which the same counted value is added.

11. The method of claim 9, wherein transmitting, at the primary device, when a predetermined initialization condition is fulfilled, to the secondary device a demand message for requiring that the history of execution along with the condition information stored in the storage unit be eliminated, and eliminating, at the secondary device, the history of execution along with the condition information in the storage unit when the demand message is received.

12. The method of claim 11, wherein when an instruction from an outside is received in the primary device, transmitting from the primary device the demand message to the at least one secondary device by determining that the initialization condition is fulfilled and transmitting from the primary device one or more instruction messages to the secondary device one by one in connection with one or more instruction conditions being fulfilled one by one.

* * * * *